F. R. PARKER.
ELECTRICAL PROTECTIVE APPARATUS.
APPLICATION FILED MAR. 8, 1907. RENEWED JAN. 8, 1920.
1,350,329.
Patented Aug. 24, 1920.
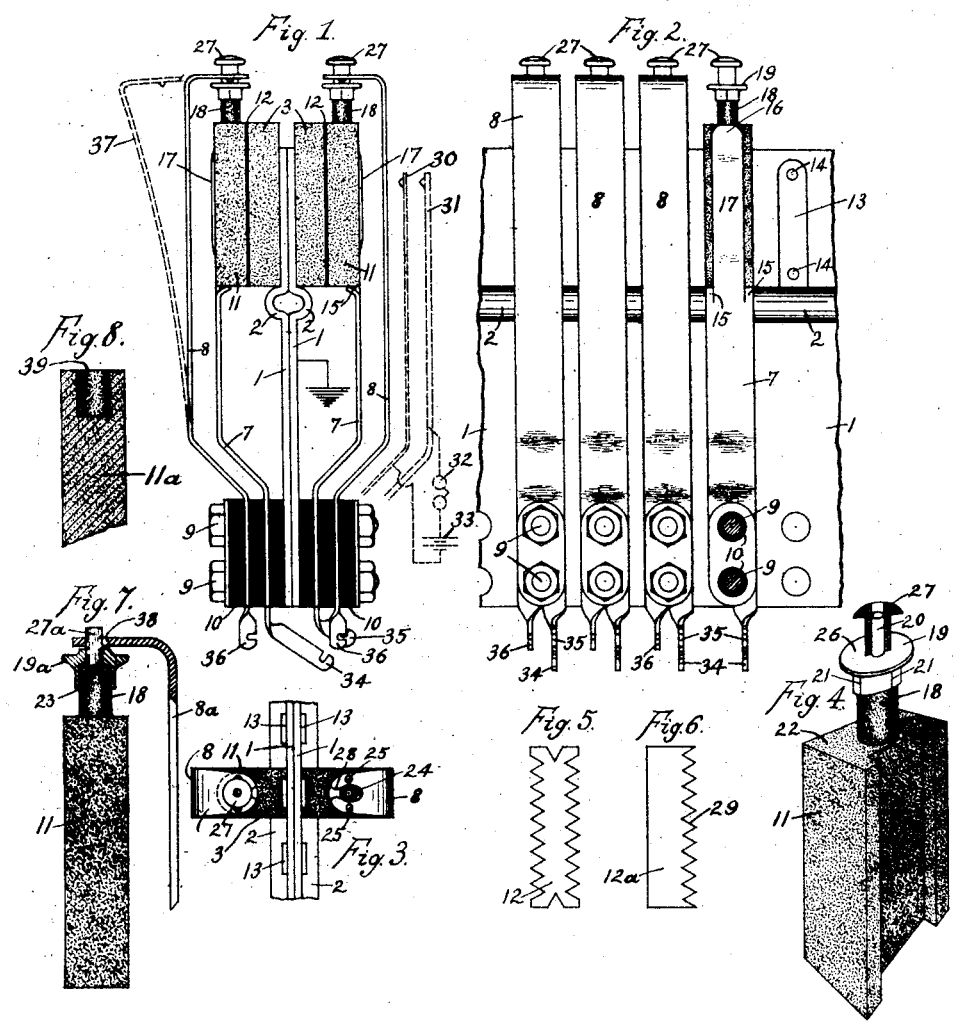
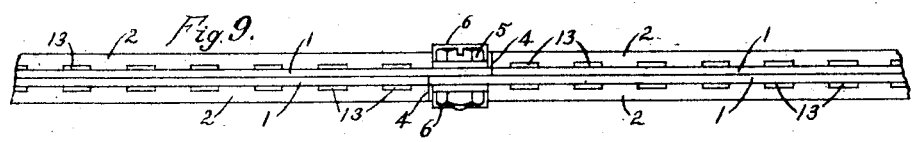
WITNESSES:
INVENTOR:
Frederick R. Parker.

UNITED STATES PATENT OFFICE.

FREDERICK R. PARKER, OF CHICAGO, ILLINOIS.

ELECTRICAL PROTECTIVE APPARATUS.

1,350,329.   Specification of Letters Patent.   Patented Aug. 24, 1920.

Application filed March 8, 1907, Serial No. 361,354. Renewed January 8, 1920. Serial No. 350,249.

*To all whom it may concern:*

Be it known that I, FREDERICK R. PARKER, a citizen of the United States of America, residing at Chicago, in the county of Cook and State of Illinois, have invented new and useful Electrical Protective Apparatus, of which the following is a specification, reference being had to the accompanying drawings, illustrating the invention.

My invention relates to apparatus and devices for protecting electrical circuits and apparatus from injury from abnormal electrical currents and charges, and in particular to such apparatus employing high-potential electricity arresters and thermal protectors commonly known as "sneak current" protectors.

The principal objects of my present invention are,—to provide improved and simplified apparatus and devices, and parts thereof, of the characters herein set forth; to provide an improved, simplified, and highly efficient electro-thermal protector; to provide improved heat-susceptible material in electro-thermal protectors; to provide an improved high-potential electricity arrester; to provide an improved dielectric for the high-potential electricity arresters; to provide an improved unitary protective device comprising electrothermal mechanism and high-potential electricity arresting mechanism, and improved coöperation of such a device with the protective apparatus; to provide an improved arrangement of the electrothermal protective devices and their corresponding high-potential electricity arresters, relatively to each other; to provide an improved arrangement of terminals for such apparatus; and to provide an improved mounting plate or ground plate for such apparatus. Other objects will be apparent from the following specification.

By reference to the accompanying drawings illustrating the preferred forms of my invention,—

Figure 1 is a plan view of a pair of duplicate sets of the protective apparatus, similarly arranged on and with respect to opposite sides of the mounting plate, an alarm arrangement being shown on the right in dotted lines and an operating spring being shown in an operated position on the left in dotted lines; Fig. 2 is a side view of Fig. 1, showing a series of sets of the protective apparatus mounted along the mounting plate, with portions of one set removed; Fig. 3 is a top end view of Fig. 1, with a portion of one thermal protector removed; Fig. 4 is a perspective view of one combined thermal-protector and arrester-electrode unit, with a portion of the thermal protector shown in longitudinal cross-section; Figs. 5 and 6 are side views of preferred forms of the improved dielectrics for the arresters; Fig. 7 is a plan view of a modified form of thermal protector and arrester electrode, with portions shown in cross-section; Fig. 8 is a longitudinal cross-sectional view of a portion of a modified form of arrester electrode having provision for accommodating a thermal protector at one end thereof; and Fig. 9 is a front edge view of portions of two sections of one form of the improved protector mounting plate, showing the sections secured together end to end and the improved means employed in securing the sections together.

Like characters refer to like parts in the several figures.

The protector mounting plate of Fig. 1 is preferably made of two flat sheet-metal plates 1 1 secured together preferably as shown. Each plate 1 may be ribbed as at 2 to stiffen the mounting plate and provide stops for the inner or grounded electrodes 3 3 of the high-potential electricity arresters or lightning arresters, if desired. The mounting plate 1 1 is preferably grounded. The mounting plate is preferably made in sections which are secured together preferably as shown in Fig. 9. A portion of the end of one plate 1 of each section is cut off as shown at 4 4, or the plates of each section are assembled out of complete register with each other, so as to allow the end portions of two of the plates 1 1 of the respective adjacent sections to overlap and form a joint in the mounting plate as at 4 4. Mounting strips 6 6 for the ground plate may be placed on opposite sides of the overlapping ends of the plates 1 1 secured to the plate 1 1 and the latter secured together by bolts 5 which extend through the strips 6 6 and the overlapping ends of the plates 1 1. By means of the strips 6 6 the mounting plate 1 1 may be mounted vertically, or in any other desired position, to a suitable support. It will be seen that the sections of the mounting plate 1 1 are constructed so that any one, or all, of a series of the sections may be turned end for end if desired.

I preferably mount the protective apparatus on both sides of the mounting plate 1 1, in duplicate sets, as shown in Fig. 1, but it may be mounted on one side only of plate 1 1 if desired. Spring members 7 7 leading to the line conductors, and 8 8 leading to the switchboard, (in telephone systems) or to circuits to be protected, are mounted onto plate 1 1, preferably near the rear edge thereof, by bolts 9 9, and are suitably insulated from each other and from the plate 1 1 by insulation 10. The free end of each line spring 7 holds a lightning arrester, comprising electrodes 3 and 11 and an interposed dielectric 12 in place against the ground plate 1 1 preferably as shown. Underneath each electrode 3 may be a strip 13, riveted to the plate 1 1 by rivets 14 14 which also hold the two halves of the mounting plate 1 1 together. The strips 13 13 fit in grooves in the electrodes 3 3 to keep same in alinement with the apparatus. Each spring 7 is provided with stops 15 15 to limit the insertion of the outer electrodes 11 11 into the apparatus. Each spring 7 is adapted to bear against the main body portion of its electrode 11 at the outer end of the latter, as shown at 16 in Fig. 2, the spring 7 being bent away from the electrode 11 at 17 so as to bear against the electrode at both ends thereof only and thereby hold the electrode 3 tightly against the ground plate and the electrodes 3 and 11 tightly against the dielectric 12 throughout its length.

The outer end of each electrode 11, which electrode is preferably made of carbon or other suitable material, is preferably provided with a cylindrical extension 18 as shown in perspective in Fig. 4. This extension or element 18 is the heat-producing means of the excess-current thermal protector. A metal cap 19, provided with a central stem 20 and slit as at 21 21 so as to firmly grip the portion 18 and make good electrical connection therewith, is forced onto the end of the portion 18 far enough to adjust the resistance of 18 between the cap 19 and the end 22 of electrode 11 to the desired amount, and is there firmly cemented in place by a suitable cement so as to provide good conductivity between the parts 18 and 19. The edges at the slits 21 21 may be turned in slightly if desired, so as to firmly engage the portion 18. The cement may be applied around the sides of 18 or at the end thereof as shown at 23 in Fig. 7, or at both the sides and end with the heating element 18 attached to the electrode 11 in this manner, the electrothermal device and the electrode constitute a unitary device removable from and replaceable into the remainder of the apparatus as a unit. Likewise, with this construction, both of the electrodes 3 and 11 of the arrester, the dielectric 12, and the electrothermal device 18—19—27, may all be removed from or replaced into the apparatus as a whole or as a unit.

In some instances it has been found that certain homogeneous resistance rods or elements, in the nature of a solid piece of material, are objectionable as heating elements in electro-thermal protectors, because the resistance thereof varies considerably upon repeated heating with various currents. I have found that the resistance of such heating elements, or resistance elements, can be kept very uniform, thus eliminating the above objections, by first heating the element with a current larger than the currents to be sent through it thereafter, and leaving the said larger current in the element longer than smaller currents will remain therein thereafter. In other words the resistance of such a heating element or resistance element can be kept practically constant by first electrically heating the element to a greater extent than it will afterward be heated in the use of the device. The larger current sets the resistance of the element to a certain value, which value will not be materially changed by lesser currents passing through the element for a shorter period of time. A still larger current may set the resistance of the element to a new value. The heating element 18 of my invention is preferably treated as above described, before the cap 19 is cemented in place. When the cap 19 is being cemented in place, the resistance of 18 is measured while the cap 19 is being pressed thereon, the cap 19 being pressed onto the element 18 until the resistance of the latter is adjusted to the proper amount, in which position the cap 19 is cemented in place. After the cap 19 is suitably cemented in place, the exposed surface of the portion 18 may be shellacked all over to protect it from atmospheric conditions and insulate it from conducting particles and objects which might otherwise vary its resistance. By this construction and treatment the resistance of the heating element 18 may be readily adjusted to the proper amount and kept practically constant.

The free end of spring 8 is cut away as shown at 24 and is provided with suitable contacts 25 25 adapted to bear against the flat surface 26 of cap 19 to make electrical connection therewith. A sleeve of heat-susceptible insulating material 27 is placed over pin 20 and through the opening 24 so as to hold the spring 8 in set position as shown in Fig. 1. In setting the apparatus, spring 8 is first pressed to the position shown in Figs. 1 and 3, the bifurcated end portion straddling the pin 20, and then the sleeve 27 is placed over the pin 20, extending through the opening 24 of spring 8 and thereby holding the latter in set position. The opening 24 is preferably narrow at 28 so that the end portions of spring 8 will hold against the sleeve 27 and at the same time freely move past the pin 20 when the sleeve 27 is softened or removed. The sleeve 27 is preferably provided with a head thereon for convenience in handling. The heat-susceptible material 27 preferably becomes softened at a lower temperature than does the cement which secures the cap 19 to the portion 18. For the heat-susceptible material 27 I may use sealing wax, bees-wax, paraffin, soft glass (where a heat-susceptible insulating non-inflammable material is required), or various other materials. In some instances it is very desirable to employ a heat-susceptible insulating non-inflammable material in electrical protectors, to avoid fires which may be caused or helped along by inflammable material, and I desire it to be understood that I wish to claim such material broadly in connection with this invention, for all uses with electrothermal protectors and with all kinds of electrothermal apparatus except as dielectrics for high-potential electricity arresters the use as which is claimed broadly in my United States Letters Patent No. 1,179,380, dated April 11, 1916, on high-potential electricity arrester, being transferred thereto from the present application.

In the lightning arrester, comprising the electrodes 3 and 11 and the dielectric 12, I preferably employ a heat-susceptible dielectric with notched edges, as shown in Figs. 5 or 6. Where the dielectric of Fig. 6 is used, the notched edge 29 is placed downwardly so as to allow particles of carbon which may be broken off by the discharge through the arrester, or particles of disintegration to fall from the arrester, thereby making the arrester self-cleaning. The discharge through the arrester preferably passes from one electrode to the other through the notches in the dielectric 12 or 12ª. When a continued arc is formed within the arrester, the heat therefrom softens the dielectric 12 or 12ª which allows the electrodes to come together and stop the arc. In some lightning arresters it is very desirable to have a heat-susceptible or softenable dielectric which is non-inflammable, so that when the dielectric is softened and pressed out from between the electrodes of the arrester it will not burn or start a fire and cause serious damage. As a dielectric to fill this want I preferably employ a thin sheet of soft glass, preferably cut away at its edge or edges as shown in Figs. 5 and 6, or otherwise, to provide openings for or means for accommodating the discharge through the arrester. If desired, the dielectric may be somewhat smaller than the discharge surfaces of the electrodes, so as to provide a discharge gap along the edges of the electrodes between the discharge surfaces. When a continued arc is formed in the arrester, the glass is softened by the intense heat of the arc and pressed out from between the electrodes 3 and 11 by the spring pressure on the electrode 11, sufficiently to allow the electrodes 3 and 11 to come together and thereby form a conductive path through the arrester, thus stopping the arc and the excessive heating.

If it is desired to have an alarm to be operated by the operation of a thermal protector, a pair of springs 30 and 31 may be provided for each protector set, to which is connected an alarm 32 and battery 33. When spring 8 operates it bears spring 30 into contact with spring 31 and thereby closes the circuit of battery 33 through the alarm 32, which operates or sounds the alarm 32 to indicate that a protector has operated.

For convenience in wiring I preferably arrange both line terminals 34 and 35 of a pair of springs 7 7 on one side of the plate 1 1 so that the twisted pair of cross-connecting wires of the ordinary distributing or cross-connecting board, which are generally subject to change, may be brought direct to the terminals 34 35 without being divided and carried to opposite sides of the plate 1 1. I do not arrange the switchboard terminals 36 36 both on one side of the plate 1 1 because the pairs of switchboard wires, being permanently connected to the protectors, can be once readily divided and carried to opposite sides of the plate 1 1 when the system is being installed. This construction of placing both line terminals and one switchboard terminal of a pair of protectors on one side of the mounting plate 1 1, and only one switchboard terminal of the pair on the other side of plate 1 1, simplifies the manufacture of spring parts and at the same time provides the advantages for cross-connecting provided by other protectors in which the switchboard terminals and line terminals are all arranged on respective opposite sides of the mounting plate.

The operation of a thermal protector of my invention is as follows:

The thermal circuit through the device is from line spring 7, through heating element 18, metal cap 19, and contacts 25 25 to switchboard spring 8. An abnormally large current of electricity traversing this path, or simply through the heating element 18, causes the resistance of 18 to produce heat which is conducted to the heat-susceptible material 27 by the metal cap 19, and which softens the material 27. When the material 27 is sufficiently softened it releases spring 8 which operates from the set position shown in Figs. 1 and 3 to the position shown in dotted lines at 37 in Fig. 1, and thereby opens the circuit to the switchboard. The heat-susceptible material 27 releases spring 8 in that it allows the portions 28 of spring 8 to cut through or slide through the softened material 27. As spring 8 engages cap 19 at contact points 25 25 only, very little of the heat is conducted off through spring 8 where it would be wasted. When spring 8 operates it may operate an alarm as described above. After spring 8 has operated, if the abnormal current is of high voltage it may arc through the lightning arrester to ground. If the arc continues in the arrester the dielectric 12 (or $12^a$) will soften and allow the electrodes 3 and 11 to come together and stop the arc, as above described, thereby grounding the line. If the abnormal current is not of high voltage it will not arc through the arrester. Thus it will be seen that the lightning arrester grounds the line when it should be grounded, and only when it should be grounded; that is, when a high-voltage current is present in the circuit. When the abnormal current is of a low voltage it is not necessary to ground the line, merely opening the circuit to the switchboard being sufficient.

To reset the thermal protector for another operation, the used sleeve 27 is removed, spring 8 is pressed back to place as originally, as shown in Figs. 1 and 3, and a new sleeve 27 is slipped over pin 20.

If a high-voltage current of electricity comes to the apparatus and forms a continued arc in the arrester 11 12 3, the heat of the arc will be conducted through parts 18 and 19 to heat-susceptible material 27 and will soften the latter and thereby cause spring 8 to operate as described above. The heat of the arc may also soften the dielectric 12 and thereby ground the line as desired. If the discharge through the arrester is of small volume and short duration, such as a weak stroke of lightning, it will not cause spring 8 to operate, nor ground the line by softening the dielectric 12.

In Fig. 7 I have shown a modified form of my invention in which a pin $27^a$ of heat-susceptible conducting material, such as an easily fusible solder, is inserted through a hole 38 in spring $8^a$ and into cap $19^a$, to hold spring $8^a$ in a set position. When the heating element 18 heats and softens the pin $27^a$ the spring $8^a$ preferably shears pin $27^a$ off and operates to open the circuit. This device may be reset by replacing the used pin $27^a$ with a new one, first setting spring $8^a$ to the position shown.

In Fig. 8 I have shown an electrode $11^a$ with a hole 39 in one end thereof adapted to receive a heating element for the thermal protector, if it is desired to construct the heating element as a separate piece from the electrode. With this construction a continued arc in the arrester will operate the thermally-operable apparatus the same as in Fig. 1. This feature of causing an arc in the arrester to operate the thermal protector, is a very desirable one, especially in telephone protective apparatus, because it is desired to cut the switchboard off from the line when the latter becomes crossed with a high-voltage wire. With protective apparatus now in use this cannot be depended on.

I do not wish to limit this invention to all of the particular details herein set forth, as many modifications thereof may be made or utilized without departing from the scope of the appended claims.

I desire it to be understood that certain features of my invention may be used apart from other features of the invention, and also that they may all be used together, without departing from the scope of the claims.

The process of treating electrical resistances to stabilize their resistance, disclosed in this application, forms the subject matter of my co-pending United States patent application Serial No. 398,559, filed July 23, 1920, on process of treating electrical resistances to stabilize their resistance, which is a division of the present application.

Certain forms of the high-potential electricity arresters and dielectric members therefor disclosed in this application, form the subject matter of my co-pending United States patent application Serial No. 398,560, filed July 23, 1920, on high-potential electricity arrester, which is a division of the present application.

The mounting plate disclosed in this application, forms the subject matter of my co-pending United States patent application Serial No. 400657, filed August 2, 1920, on mounting plate for electrical protective apparatus, which is a division of the present application.

This invention is a modification of the inventions disclosed in my United States Letters Patent No. 1,238,728, dated Aug. 28, 1917, on combined lightning arrester and thermal protector, and in my United States Letters Patent No. 1,245,014, dated Oct. 30, 1917, on electrical protective apparatus, and in my United States Letters Patent No. 1,252,942, dated Jan. 8, 1918, on electrical protector.

Certain forms of the high-potential electricity arresters and dielectric members therefor disclosed in this application are described and claimed in my United States Letters Patent No. 1,179,380, dated Apr. 11, 1916, on high-potential electricity arrester.

Certain forms of sheet-metal mounting plates or ground plates for electrical protective apparatus are disclosed in my United States Letters Patent No. 793,802, dated July 4, 1905, on electric protective apparatus, and in my United States Letters Patent No. 802,939, dated Oct. 24, 1905, on ground plate for electric protective apparatus, and in my co-pending United States patent application Serial No. 31,487, filed June 1, 1915, on mounting plate for electrical protective apparatus.

Another form of sheet-metal mounting plate or ground plate for electrical protective apparatus is disclosed in my United States Letters Patent No. 968,395, dated Aug. 23, 1910, on self-cleaning electrical protective apparatus.

What I claim herein is:

1. In apparatus of the character described, a high-potential electricity arrester comprising a pair of electrodes normally held in separated relation and in close proximity to each other by a suitable dielectric, an extension on one of the electrodes adapted to produce heat upon abnormal electrical conditions, a suitable terminal cap on the said extension, a circuit-controlling spring, and a piece of heat-susceptible material normally holding the circuit-controlling spring in contact with the said cap.

2. In apparatus of the character described, a high-potential electricity arrester comprising electrodes normally held in close proximity to each other, an extension on one of the electrodes adapted to produce heat upon abnormal electrical conditions, a terminal for the said extension, circuit-controlling means, and heat-susceptible material normally holding the said terminal and circuit-controlling means in electrical connection with each other.

3. In apparatus of the character described, a high-potential electricity arrester comprising electrodes normally held in close proximity to each other, excess-current heat-producing means aside from the arrester but associated with one of the electrodes whereby an arc in the arrester heats the heat-producing means, circuit-controlling means, and heat-susceptible material normally holding the circuit-controlling means in circuit with the heat-producing means.

4. The combination of an electro-thermal protector comprising heat-producing means and operable mechanism adapted to be operated by heat from the heat-producing means, and a high-potential electricity arrester aside from the said electro-thermal protector but associated therewith whereby an arc in the arrester heats and thereby causes the operation of the said mechanism.

5. The combination of an excess-current protector comprising heat-producing means and operable mechanism adapted to be operated thereby upon abnormal current conditions, and a high-potential electricity arrester aside from the said excess-current protector but associated therewith whereby abnormal electrical conditions in the arrester causes the operation of the said mechanism.

6. A high-potential electricity arrester comprising suitable electrodes, an extension on one of the electrodes adapted to produce heat upon abnormal electrical conditions, circuit switching means, and heat-susceptible material normally holding the circuit switching means in circuit with the said extension.

7. A high-potential electricity arrester comprising suitable electrodes, an extension on one of the electrodes adapted to produce heat upon abnormal electrical conditions therein switching means, and heat-susceptible material normally holding the switching means in set relation to the said extension to be operated by heat therein.

8. A high-potential electricity arrester comprising suitable electrodes, an extension on one end of one of the electrodes, said extension being adapted to produce heat upon abnormal current conditions, a metallic cap fitted on the said extension, an operable spring member, and heat-susceptible material normally holding the said spring member under tension in electrical connection with the said cap.

9. A high-potential electricity arrester comprising suitable electrodes, an extension on one end of one of the electrodes, said extension being adapted to produce heat upon abnormal current conditions, a metallic cap fitted on the said extension, an operable spring member, and a piece of heat-susceptible material removably engaging the said cap whereby the said spring member is held under tension in electrical connection with the said cap.

10. A high-potential electricity arrester comprising suitable electrodes, an extension on one end of one of the electrodes, said extension being adapted to produce heat upon abnormal current conditions, a metallic cap fitted on the said extension, said cap having a substantially flat contact surface and a pin extending therefrom, an operable spring member provided with a suitable slot at the end thereof for accommodating the said pin and suitable contacts to engage the said flat surface of the cap, and a hollow piece of heat-susceptible insulating material placed over the said pin and through the said slot whereby the said spring member is held under tension in contact with the said cap, the said spring member moving out of contact with the said cap when the heat-susceptible material is softened or removed.

11. In an electrothermal device having operable mechanism and a resistance heater for causing the operation of the said mechanism, soft glass under control of the heater and normally holding the said mechanism from operating but permitting it to operate when softened by heat from the heater.

12. In a thermally-operable device having operable mechanism and a resistance heater for producing heat to cause the operation of the said mechanism, noninflammable heat-susceptible insulating material under control of the heater and normally holding the said mechanism from operating but permitting it to operate when heated.

13. The combination with electrical protective apparatus adapted to receive and hold a protective device, of an electrode of a high-potential electricity arrester and a resistance heater aside from the said electrode but attached thereto whereby the said electrode and heater constitute a unitary device adapted to be removed from the said apparatus or replaced therein as a unit, and switching mechanism under control of the heater.

14. The combination with electrical protective apparatus adapted to receive and hold a protective device, of a high-potential electricity arrester and a resistance heater aside from the said arrester but attached thereto whereby the arrester and heater constitute a unitary device adapted to be removed from the said apparatus or replaced therein as a unit, and switching mechanism under control of the heater.

15. The combination of a high-potential electricity arrester having electrodes, and a separate resistance heater carried by an electrode, the said heater having thermally-operable mechanism under its control.

16. The combination with a resistance heater having thermally-operable mechanism under its control, of an electrode of a high-potential electricity arrester aside from the said heater but attached thereto.

17. The combination with a resistance heater having thermally-operable mechanism under its control, of a separate high-potential electricity arrester positioned in close proximity to the said heater whereby excessive heating in the arrester heats the said heater sufficiently to cause same to heat the said mechanism to operate it.

18. A high-potential electricity arrester having suitable electrodes, a resistance heater aside from the arrester but carried by one of the said electrodes and adapted to produce heat upon abnormal electrical conditions, and thermally-operable switching mechanism under control of the said heater.

19. The combination with electrical protective apparatus comprising a ground plate and sets of spring members mounted upon the ground plate and adapted to receive protective devices, of a unitary protective device for each set of spring members, comprising an electrode of a high-potential electricity arrester and a separate electrothermal device mechanically connected together whereby they may be removed from the said spring members or replaced therein as a unit, each said electrothermal device having suitable switching mechanism under its control.

20. The combination with electrical protective apparatus comprising a ground plate and sets of spring members mounted upon the ground plate and adapted to receive protective devices, of a unitary protective device for each set of spring members, comprising a high-potential electricity arrester and a separate electrothermal device mechanically connected together whereby they may be removed from the said spring members or replaced therein as a unit, each said electrothermal device having suitable switching mechanism under its control.

21. The combination with electrical protective apparatus adapted to receive and hold a protective device, of an electrode of a high-potential electricity arrester and a separate resistance heater mechanically connected together whereby the said electrode and heater constitute a unitary device adapted to be removed from the said apparatus or replaced therein as a unit, and operable mechanism under control of the heater.

22. The combination with electrical protective apparatus adapted to receive and hold a protective device, of a high-potential electricity arrester and a separate resistance heater mechanically connected together whereby the said arrester and heater constitute a unitary device adapted to be removed from the said apparatus or replaced therein as a unit, and operable mechanism under control of the heater.

23. The combination with a resistance heater having thermally-operable mechanism under its control, of a separate electrode of a high-potential electricity arrester mechanically connected with the said heater whereby the latter and the electrode constitute a unitary device.

24. The combination with a resistance heater having thermally-operable mechanism under its control, of a separate high-potential electricity arrester mechanically connected with the said heater whereby the latter and the arrester constitute a unitary device.

25. In apparatus of the character set forth, a unitary structure comprising an electrode of a high-potential electricity arrester and a separate resistance heater attached to each other.

26. The combination with a high-potential electricity arrester, of thermally-operable mechanism having a resistance heater for causing the operation thereof upon an abnormal current in the heater, the latter being apart from the arrester but adapted and arranged to transmit heat from the arrester to the said thermally-operable mechanism to cause the operation thereof upon excessive heating in the arrester.

27. The combination with electrical protective apparatus comprising a ground plate and sets of spring members mounted upon the ground plate and adapted to receive protective devices, of a unitary protective device for each set of spring members, comprising in its construction a high-potential electricity arrester and a separate resistance heater adapted and arranged to be removed from the said spring members or replaced therein as a unit, each said device having thermo-responsive mechanism under its control.

As inventor of the foregoing I hereunto subscribe my name in the presence of two subscribing witnesses, this 4th day of March, 1907.

FREDERICK R. PARKER.

Witnesses:
    WALTER A. GREIG,
    ROBERT G. PARKER.